Aug. 27, 1968  H. ELINEAU  3,398,616
CONTINUOUS MOTION SHEARING MACHINE, PARTICULARLY
FOR PRODUCTS IN STRIPS
Filed July 5, 1966  4 Sheets-Sheet 1

INVENTOR.
Hubert Elineau
BY Sparrow + Sparrow
Attorneys

INVENTOR.
Hubert Elineau
BY Sparrow & Sparrow.
Attorneys

United States Patent Office 3,398,616
Patented Aug. 27, 1968

3,398,616
CONTINUOUS MOTION SHEARING MACHINE,
PARTICULARLY FOR PRODUCTS IN STRIPS
Hubert Elineau, Mont-Saint-Aignan, France, assignor
to R. Senard, et Fils, Maromme, France, a French
company
Filed July 5, 1966, Ser. No. 562,670
Claims priority, application France, July 6, 1965,
7,107
7 Claims. (Cl. 83—305)

The present invention relates to an improved shearing machine, with continuous action, of the type commonly known in the metal industry under the name of "flying shearing machine." This shearing machine is particularly, but not exclusively, suitable for cutting products in strips such as sheet-iron, metal or plastic sheets, cardboards, papers or others.

Shearing machines of the rotary motion type are already known, the cutters of which, during cutting, go together in its advancing motion, with the product to be sheared, and which cut the product perpendicularly, but carry out the cutting periodically only, after the cutters have performed a number of closed trajectories, during which the kinetic energy of the shearing machine can be restored to the gradient necessary for a good performance of the cut. Some such shearing machines are known the cuts of which are separated by one or several false cuts during which the cutters come close to another without however coming into contact of the product to be cut. Many devices to actuate the cutters of the shearing machines have been put forward to achieve this result, in particular devices with articulated parallelograms or with cycloidal kinematics, but all these devices do not allow to reconcile the requirements of cutting variable lengths of various products brought at high speed to the shearing machine, with the possibilities of a machine of comparatively simple construction and not very heavy, driven by a normal motor.

The present invention is intended to remedy these drawbacks by providing a shearing machine that can be used in a big variety of cases, particularly in those when the product to be cut is moving at high speed, this shearing machine being comparatively simple to work out, and light, and requiring only, to work, one or several motors of normal characteristics.

The invention mainly consists in providing for the shearing machine identical devices, but that are symmetrical about the plane in which the product to be cut is brought in, every one of these devices driving one of the cutters of the shearing machine and comprising a push-rod that is connected to a cutter, and the crank-head of which swivels on an eccentric which rotates in turn round the crank-pin of a crank-shaft actuated by a motor, the aforesaid eccentric being driven by a planet gear rotating round the axle of the crank-pin by engaging with a pinion that rotates round an axle fixed on the crank-shaft and connected to a planet loose pinion engaging with a planet gear with an interior gearing the rotation speed of which can be adjusted to the rotation speed of the crank-shaft, the crosshead being held in position by a means of guiding.

The invention also consists in certain other hereinafter mentioned arrangements preferably used together with the aforesaid main arrangement.

The invention relates more particularly to certain methods of application and realization of these arrangements; it relates more particularly still, and this as new industrial products, to improved shearing machines of the type in question and to elements and tools suited to work them out, together with the plants, machines or other units embodying these shearing machines.

By way of mere example and in order that the invention could be more easily understood, a description is given hereinafter of the particular methods of working out the invention, methods which are illustrated diagrammatically and with no limitation in the attached drawing, on which:

Figures 8, 9:
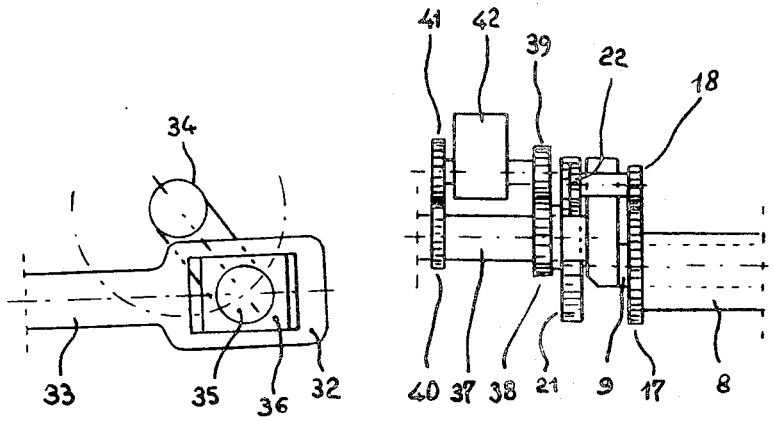

FIGURE 8 partially shows a detail of another variant of the shearing machine, and FIGURE 9 represents a cinematic chain of shearing machine according to the invention.

If it is intended to work out an improved shearing machine according to the invention, and, more especially, according to the one of its methods of application and of those of the methods of realization of its various parts, to which it seems that preference should be given, one should proceed as follows or in a similar manner.

Figure 1:
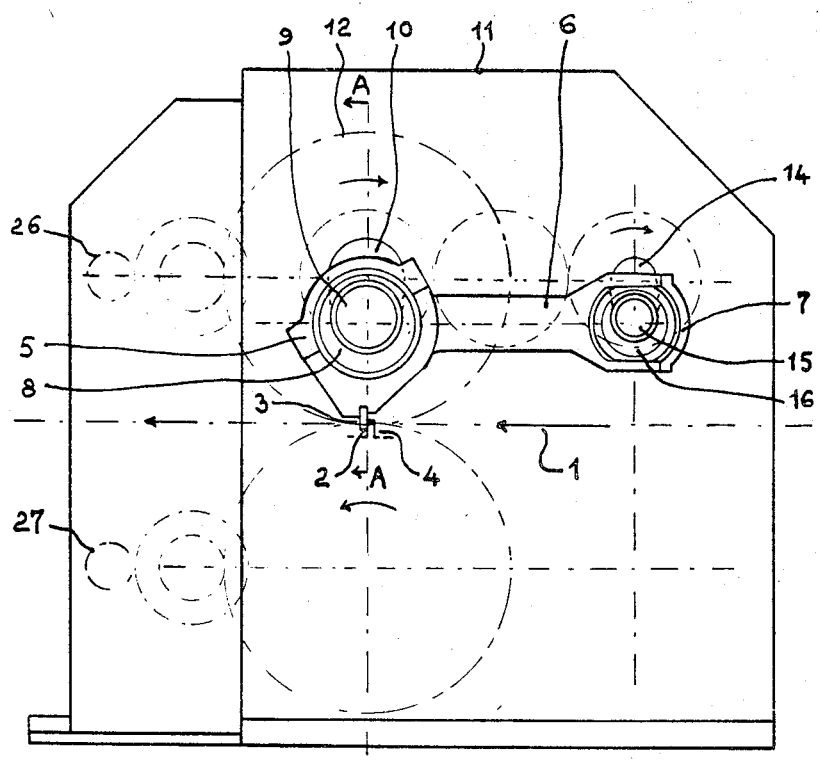
FIGURE 1 shows a partial longitudinal section by a vertical plane of a shearing machine worked out according to the invention.
Figure 2:
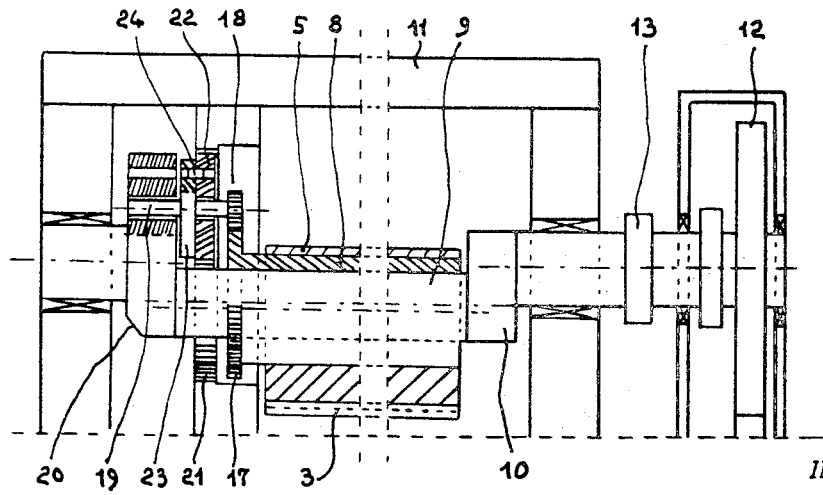
FIGURE 2 is a partial vertical cross-section along plane A—A of FIGURE 1.

The product to be cut being fed into the shearing machine along the plane of feeding in 1 and cutting being to take place in 2, the machine is fitted with two mechanisms that are identical, but symmetrical about plane 1, each of these mechanisms actuating one of the cutters 3 and 4 of the shearing machine. Cutter 3 is connected by any appropriate means to crank-head 5 of push-rod 6 the crosshead 7 of which is guided so that in cutting position cutter 3 is brought along perpendicularly to plane 1. In the case of FIGURE 1, the guiding is obtained by giving the same motion to crank-head 5 and to crosshead 7 of push-rod 6, the latter being always parallel to plane 1 and cutter 3 being always perpendicular to this plane 1.

The crank-head 5 of push-rod 6 swivels on an eccentric 8 rotating in turn on the crank-pin 9 of a crank-shaft 10. This crank-shaft 10 swivels in the frame 11 of the shearing machine. It is driven by a suitable motor through a pinion shafting 12 and a coupling 13. Shafting 12 also drives the crank-shaft that is symmetrical to crank-shaft 10, corresponding to cutter 4 together with crank-shaft 14 and its symmetrical counterpart, the crank-pin 15 of crank-shaft 14 accommodating the crosshead 7 of push-rod 6 through an eccentric 16. Crank-shaft 14 rotates in a parallel direction to crank-shaft 10 and it is arranged, and so is eccentric 16, so as to give to the crosshead 7 of the push-rod 6 a motion during which the push-rod remains parallel to itself.

Figure 3:
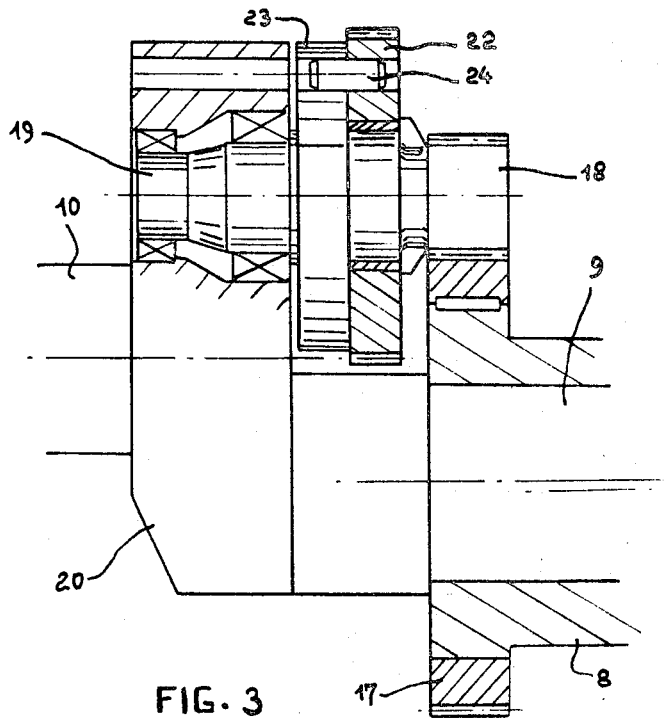
FIGURES 3 and 4 show, in vertical cross-section, a mechanism that allows to initiate or to discontinue the false cuts of the shearing machine in the positions for initiating or discontinuing them respectively.

The use of eccentrics 8 and 16 is to obtain that the cuts performed by cutters 3 and 4 are separated by one or several false cuts during which cutters 3 and 4 come close to one another without however coming into contact with the product to be cut. For this purpose, eccentrics 8 and 16 corresponding to cutter 3 rotate round their respective crank-pins 9 and 15 during the rotation of crank-shafts 10 and 14. So is the case, except for symmetry, for the eccentrics corresponding to cutter 4. The mechanism that ensures this rotation of the eccentrics round the crank-pins, and that is identical in design for the various eccentrics, will be described in connection with eccentric 8 only. This mechanism embodies a planet pinion 17 connected with eccentric 8 and engaging with a pinion 18 connected to shaft 19 swivelling in an extension of the crank-web 20 of crank-shaft 10. In 21 there is placed a planet crown wheel with interior teeth centered on the axle of crank-shaft 10, and inside which a planet pinion 22 is engaging, that is mounted loose on shaft 19. In the chosen example, crown wheel 21 is integral with frame 11 and consequently remains fixed. As will be discussed below, this planet crown wheel can also be moving and rotate round the axle of crank-shaft 10, at a speed in proportion with the latter's speed. During rotation of crank-shaft 10, the planet pinion 22 rolls over the inside of fixed crown wheel 21 and drives the shaft 19 of pinion 18 through face-plate 23 connected to this shaft. Face-plate 23 is connected to pinion 22 by an axle 24 that slides in a recess of the face-plate and pinion, but can be immobilized in the position which is more especially apparent on FIGURE 3. In this position of axle 24, eccentric 8 rotates round crank-pin 9 with a speed in proportion to the speed of crank-shaft 10. The ratios of the number of teeth of crown wheel 21 and planet gear 22, on one side, and the number of teeth of pinions 17 and 18, on the other, determine this proportion.

Figure 5:
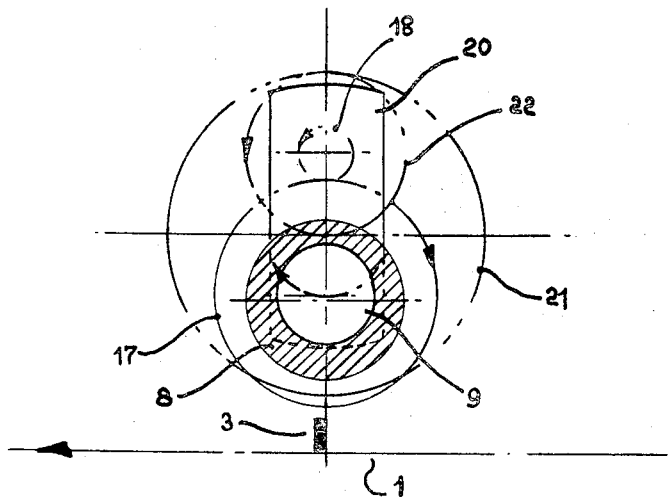
FIGURES 5 and 6 show the kinematics of a cutter of the shearing machine in positions for cut and false cut respectively.
Figure 6:
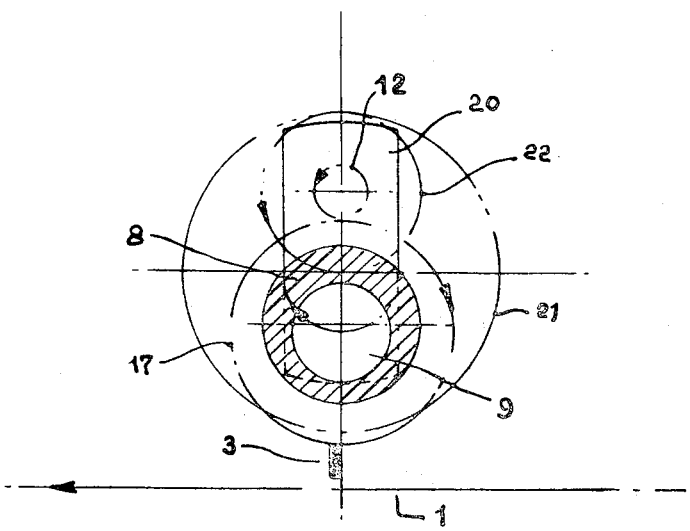
Figure 7:
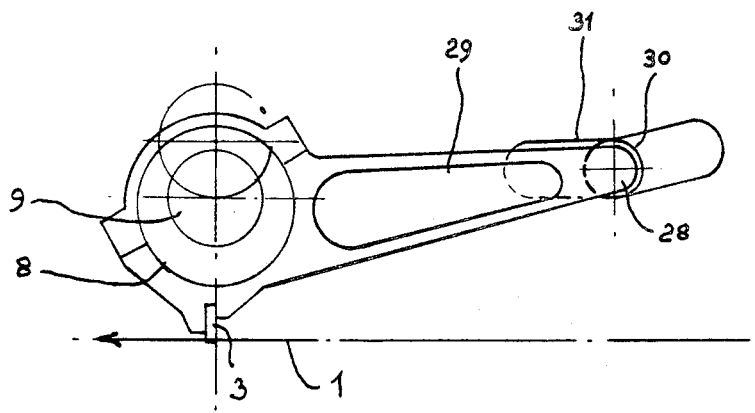
FIGURE 7 shows in partial longitudinal section by a vertical plane, a variant of the shearing machine according to the invention.

In the case of the figures of the attached drawing where the original diameter of crown wheel 21 is twice the diameter of planet wheel 22 and where the original diameter of pinion 17 is four times as big as the diameter of pinion 18, the eccentric 8 turns once round crank-pin 9 when crank-shaft 10 turns twice. FIGURES 5 and 6 illustrate these rotations which bring about cutter 3 to be in cutting position at every other turn only of crank-shaft 10. With this arrangement, a cut (FIG. 5) alternates with a false cut during every turn of the crank-shaft.

Figure 4:
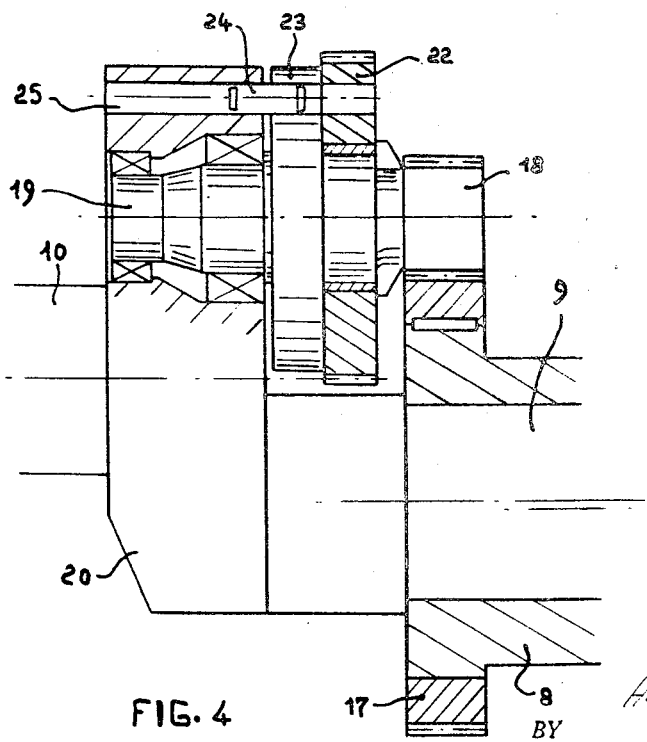

If it is required to obtain a cut at every turn of crankshaft 10, it is sufficient to place axle 24 in the position shown by FIGURE 4. Axle 24, then engaging in a recess 25 of shaft 20 of crank-shaft 10 and in face-plate 23, immobilizes axle 19, pinion 18 and pinion 17 in relation to the crank-shaft, so placing eccentric 8 in cutting position at every turn.

By varying the ratios of the gears of the mechanism described above, it is possible to obtain cuts separated by more than one false cut, for instance by two or five false cuts, the immobilization of pinion 18 in relation to the crank-shaft always enabling to obtain a cut at every turn.

Each of the cutters 3 and 4 can be driven by a separate motor actuating pinions 26 and 27 respectively, in order to ease up the mutual gearing of pinions 12 that synchronize the mechanisms of the shearing machine.

As a variant of the system described above, which provides the guiding of crosshead 7 of push-rod 6 by a crank-shaft 14 and a mechanism with eccentric 16, it is possible to use a more simple arrangement according to which crosshead 28 of push-rod 29 the crank-head of which supports cutter 3, is fitted with one or several guiding rollers 30 supported by an inclined part 31 integral with the machine frame. Roller(s) 30 and inclined part 31 are so arranged that cutter 3 is perpendicular to the feeding in plane 1 during cutting.

As another variant, crosshead 32 of push-rod 33 of the shearing machine can be driven by a crank-shaft 34 with a crank of suitable radius the crank-pin 35 of which is connected to crosshead 32 by a sliding block 36. This arrangement enables to do without the mechanisms with planet gear and planet loose pinion for the crossheads of the push-rods.

The rotation of the eccentrics, such as 8, round the crank-pins of the crank-shaft, such as 9, can also be obtained by using a mobile planet gear with interior teeth 21.

The rotation of planet gear 21 round crank-shaft 37 is obtained by connecting the planet gear to a pinion 38 actuated by a pinion 39 driven in turn by crank-shaft 31 by means of pinions 40, 41 and of an adjustable device 42 that allows to give variable speed to pinion 38, the speeds being in proportion with the speed of pinion 37.

The various moving masses of the shearing machine being animated with a rotary motion, or derived from such a motion, their occasional balancing is possible without difficulty.

It results from the above that by applying the described processes one obtains shearing machines which offer many advantages. As a matter of fact, they can be used for cutting various lengths of products of variable thickness brought along with comparatively high speed, in consideration of the product to be cut. These shearing machines can also be used, in the particular case of sheet-iron, as shearing machines "for shearing lines." They also can be used by starting their motor for every cut.

It is obvious that the invention is not confined to the given methods of application and realization, it also includes any of its variants.

What I claim is:

1. Shearing machine with a continuous motion, particularly for products in strips, comprising two mechanisms which are identical but symmetrical about the plane of feeding in of the product to be cut, each of these mechanisms actuating one of the shearing machine cutters and comprising a push-rod which is connected to a cutter and the head of which swivels on an eccentric that rotates in turn on the crank-pin of a crank-shaft driven by a motor, the aforesaid eccentric being driven by a planet gear rotating round the axle fixed to the crank-shaft and connected to a planet loose pinion engaging with a planet gear with interior teeth, with a rotation speed which is adjustable in relation to the rotation speed of the crankshaft the crosshead of the push-rod being held by a means of guiding.

2. Shearing machine, according to claim 1, wherein the planet gear with interior teeth is fixed on the frame of the shearing machine.

3. Shearing machine, according to claim 1, wherein the planet gear with interior teeth is actuated by the crankshaft through the medium of an adjustable device which allows to give variable speeds to the aforesaid planet gear.

4. Shearing machine, according to claim 1, wherein the eccentric can be immobilized by means of an axle which slides in relation to the crankshaft.

5. Shearing machine, according to claim 1, wherein the cross-head of the push-rod is guided by a crank-shaft and a mechanism with planet gear, analogous to those which actuate the head of the push-rod.

6. Shearing machine, according to claim 1, wherein the cross-head of the push-rod is guided by roller supported by an inclined part integral with the machine frame.

7. Shearing machine, according to claim 1, wherein the cross-head of the push-rod is guided by a crank-shaft connected to the aforesaid cross-head by a sliding block.

References Cited
UNITED STATES PATENTS

| | | | |
|---|---|---|---|
| 2,261,007 | 10/1941 | Talbot | 83—305 |
| 2,693,630 | 11/1954 | Rodder | 83—305 |
| 3,269,245 | 8/1966 | Elineav | 83—328 X |

WILLIAM W. DYER, Jr., *Primary Examiner.*

F. T. YOST, *Assistant Examiner.*